United States Patent Office 3,201,452
Patented Aug. 17, 1965

3,201,452
HEXACYANOETHANE AND ITS PREPARATION
Blaine C. McKusick and Swiatoslaw Trofimenko, Wilmington, Del., assignors to E. I. du Pont de Nemours and Company, Wilmington, Del., a corporation of Delaware
No Drawing. Filed Nov. 16, 1960, Ser. No. 69,566
6 Claims. (Cl. 260—465.8)

This invention is concerned with a new cyanocarbon compound and a process for its preparation.

The field of cyanocarbon chemistry was greatly stimulated by the discovery of tetracyanoethylene. This highly reactive compound led to the discovery of many derivatives and related cyano compounds. In all of this work, no percyanoalkane has been found. The only one seriously sought was tetracyanomethane which remains as yet an unknown material.

Recently it has been found that pentacyanoethanide salts can be prepared by the reaction of an alkali metal cyanide with a molecular excess of tetracyanoethylene.

It has now been discovered that pentacyanoethanide salts react with cyanogen halides in the absence of a solvent for hexacyanoethane to yield hexacyanoethane, the first percyanoalkane to be prepared. Hexacyanoethane is a white crystalline solid which sublimes at temperatures of 130° C. and above, decomposes slowly when heated in the range of 150 to 300° C. and is characterized by infrared absorption maxima at 4.40, 9.43, 9.65, and 11.55μ.

In the reaction of this invention, it suffices to bring the pentacyanoethanide salt and the cyanogen halide into intimate contact until hexacyanoethane is formed. This may be accomplished by grinding the two components together in the solid state, by suspending the pentacyanoethanide salt in a liquid cyanogen halide or by passing a gaseous cyanogen halide through a bed of finely divided pentacyanoethanide salt.

Of the cyanogen halides which are operable in the process of this invention, cyanogen fluoride and cyanogen chloride are most suitable because of their physical properties, and cyanogen chloride is particularly preferred for its ready availability.

The pentacyanoethanide salts may be employed interchangeably in the process of this invention. The alkali metal pentacyanoethanides are most readily available from the reaction of alkali metal cyanides with tetracyanoethylene and, to that extent, they represent a preferred group. This reaction is carried out in the presence of at least a 0.01 molar excess of tetracyanoethylene. Thus, the cyanides of sodium, potassium, rubidium, and cesium react readily with excess tetracyanoethylene to yield the corresponding metal pentacyanoethanides, respectively.

The pentacyanoethanides may be represented by the formula $M[C(CN)_2C(CN)_3]_x$, where M is an alkali metal cation and $x$ is the valence of the cation.

Pentacyanoethane is obtained from an alkali metal pentacyanoethanide by reaction with an aqueous mineral acid.

The reaction of forming hexacyanoethane from a pentacyanoethanide salt and a cyanogen halide takes place between equivalent molar quantities of the reactants, but the proportions in which the reactants may be mixed for this reaction to take place may be varied widely. For example, molecular proportions varying from 19:1 to 1:19 may conveniently be used. When the cyanogen halide is a liquid or a gas, it is preferred to employ a molecular excess of the cyanogen halide which then serves as a reaction medium.

Alternatively, the reaction of this invention may be carried out in a liquid diluent which is inert to the reactants and products and is substantially a non-solvent for hexacyanoethane. Non-polar organic compounds, particularly the hydrocarbons and halohydrocarbons such as hexane, benzene, carbon tetrachloride, hexafluoropropene dimer and the like are especially suitable.

The reaction of a pentacyanoethanide salt with a cyanogen halide to yield hexacyanoethane may be carried out at temperatures up to 150° C. and preferably in the range from −100° to 150° C., and more particularly between −100° C. and 25° C.

Pressure is not a critical factor in this reaction, and atmospheric pressure is therefore preferred for convenience. Pressures both above and below atmospheric are operable.

As noted above, the process of this invention is fully operable without the use of any additives whatsoever. However, it has been found that the presence of a Lewis acid catalyst of the type represented by aluminum chloride leads to increased yields of product and, therefore, represents a preferred mode of procedure. Other materials useful as catalysts for this reaction include $ZnCl_2$, $BF_3$, $SbCl_5$, $FeCl_3$, $TiCl_4$, $SnCl_4$, $TeCl_2$, $BiCl_3$, and other Lewis acids. Since the use of an acidic-type catalyst is entirely optional, no minimum concentration can be recommended. Amounts in excess of 0.1 mole per mole of pentacyanoethanide salt show no further improvement over amounts less than this value and, therefore, are not preferred.

In the following examples, parts are by weight unless otherwise indicated. Example III represents a preferred embodiment of the invention.

*Example I*

Part A.—A solution of 23 parts of tetracyanoethylene in 157 parts of dry acetonitrile is cooled to −40° C. under nitrogen. Dry, finely ground sodium cyanide, 8 parts, is added and the mixture stirred for three hours. The reaction mixture is then filtered cold under nitrogen into 2140 parts of ether. Light tan sodium pentacyanoethanide (20 parts, 69% yield) crystallizes in large plates. The product is collected on a filter and washed with ether, which has been saturated with tetracyanotheylene.

Part B.—Sodium pentacyanoethanide, five parts, is placed in a glass reactor and cooled to about −80° C. A molecular excess of cyanogen chloride is distilled into the reactor where it condenses as a solid. The cyanogen chloride is allowed to melt and the mixture is stirred. Hexacyanoethane forms as a white solid. The liquid cyanogen chloride is displaced by adding an excess of ether and the mixture is stirred at room temperature for 30 minutes. The hexacyanoethane is separated by filtration and dried. It is identified by its infrared absorption spectrum.

*Example II*

A mixture of three parts of sodium pentacyanoethanide and about 30 parts of liquid cyanogen chloride is stirred at reflux temperature (12–13° C.) in a glass reactor fitted with a condenser cooled at 0° C. and protected from moisture of the air by a calcium chloride trap. After the reaction mixture has refluxed for two hours, remaining cyanogen chloride is removed by flushing with nitrogen. The reactor is pumped down to a high vacuum and the residue heated at 75° C. Sublimation into the cool portions of the reactor gives 0.65 part of crude hexacyanoethane. This is washed with benzene to remove tetracyanoethylene and resublimed to give purified hexacyanoethane. When heated in air, hexacyanoethane sublimes at temperatures of 150° C. and above, and in a sealed capillary tube it decomposes without melting over the range of 150–300° C. The infrared absorption spectrum shows four intense bands at 4.40, 9.43, 9.65, and 11.55μ.

*Analysis.*—Calcd. for $C_8N_6$: C, 53.34; H, 0.00; N, 46.66. Found: C, 53.42; H, 0.39; N, 47.87.

*Example III*

A mixture of 210 parts of sodium pentacyanoethanide and sufficient liquid cyanogen chloride to give an easily stirrable slurry is stirred in a glass reactor fitted with a reflux condenser cooled at 0° C. Anhydrous aluminum chloride (two parts) is added and the mixture is stirred for 30 minutes. Excess cyanogen chloride is removed by distillation and the resulting pasty solid is further dried in air. The residue is sublimed in two portions by heating at 70–75° C. at 3–5 mm. pressure overnight. The remaining residues are ground and again subjected to sublimation. The combined sublimates are crushed and washed with benzene until the washings are colorless. The dried product totals 37 parts of hexacyanoethane.

Hexacyanoethane is isoluble in non-polar liquids such as benzene, ether, hexane, carbon tetrachloride and hexafluoropropene dimer. It is soluble in tetrahydrofuran, ethyl acetate, acetonitrile and 1,2-dimethoxyethane from which it may be recovered unchanged after a short time. On prolonged periods in solution, hexacyanoethane decomposes. Bases, such as triethylamine, acelerate this decomposition. With compounds containing Zerewitinoff-active hydrogen, particularly with methanol, ethanol, amines, and the like, hexacyanoethane reacts vigorously, with the evolution of hydrogen cyanide. The compound may therefore serve as a hydrogen cyanide generator.

Because of its exceptionally high heat of combustion (990 kcal./mole), hexacyanoethane is useful as a fuel for obtaining high temperatures for the melting of metals. For example, when hexacyanoethane is completely burned in an adequate supply of oxygen according to the equation $$(NC)_3CC(CN)_3 + 4O_2 \rightarrow 8CO + 3N_2 + 450 \text{ kcal.}$$

flame temperatures in the range of 4280–4660° K. may be obtained.

By a similar token, hexacyanoethane is useful as the reducing component in a thrust-producing fuel. For example, an intimate mixture of 10 parts of hexacyanoethane and 54 parts of potassium perchlorate burns smoothly and uniformly as a solid rocket propellant.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Hexacyanoethane.
2. Process for the formation of hexacyanoethane which comprises intimately contacting an alkali metal salt of pentacyanoethane with a cyanogen halide selected from the class consisting of cyanogen fluoride and cyanogen chloride at a temperature in the range —100 to +150° C.
3. Process according to claim 2 wherein the reaction is carried out in the presence of an inert liquid diluent which is inert to the reactants and products and is substantially a non-solvent for hexacyanoethane.
4. Process according to claim 2 wherein the reaction is carried out in the presence of a catalyst selected from the group consisting of aluminum chloride, $ZnCl_2$, $BF_3$, $SbCl_5$, $FeCl_3$, $TiCl_4$, $SnCl_4$, $TeCl_2$, and $BiCl_3$.
5. Process according to claim 2 wherein said cyanogen halide is cyanogen chloride.
6. Process for the formation of hexacyanoethane which comprises intimately contacting sodium pentacyanoethanide with cyanogen chloride at a temperature in the range of —100 to 25° C.

References Cited by the Examiner

UNITED STATES PATENTS

| | | | |
|---|---|---|---|
| 2,832,799 | 4/58 | Payne et al. | 260—465.4 X |
| 2,956,079 | 10/60 | LaCombe et al. | 260—465.4 X |
| 2,958,695 | 11/60 | Crowe et al. | 260—465.4 X |

OTHER REFERENCES

Huntress: "Organic Chlorine Compounds," 1948, page 439.

CHARLES B. PARKER, *Primary Examiner.*

LEON ZITVER, *Examiner.*